April 12, 1938. O. A. KEHLE 2,113,694
RUBBING MACHINE
Filed April 8, 1936 3 Sheets-Sheet 2
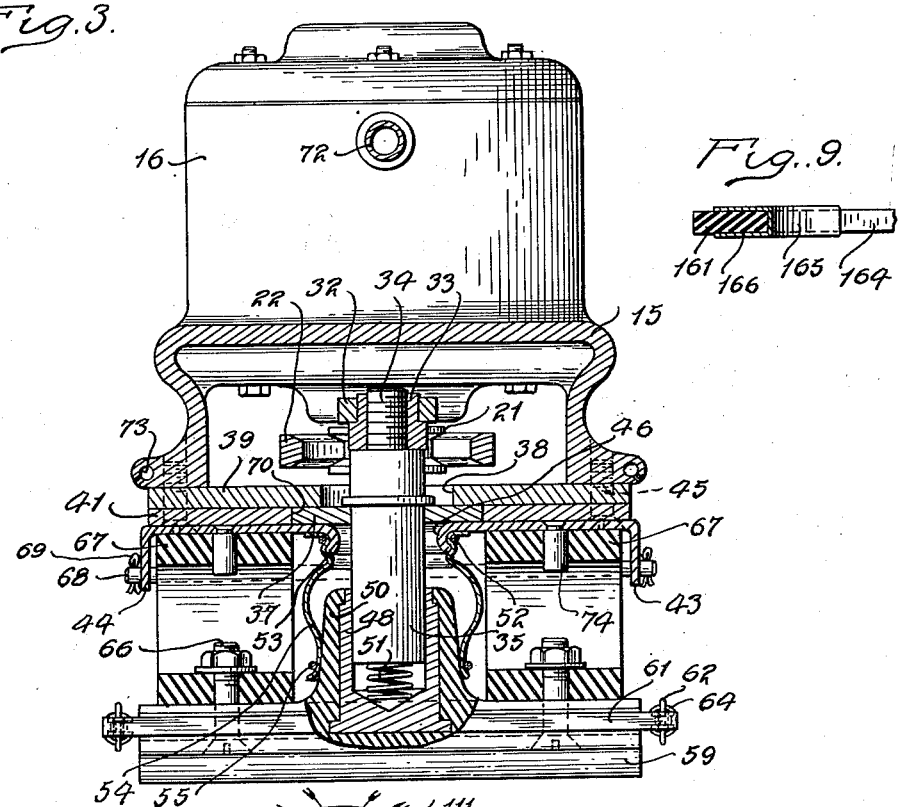
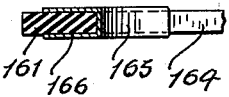
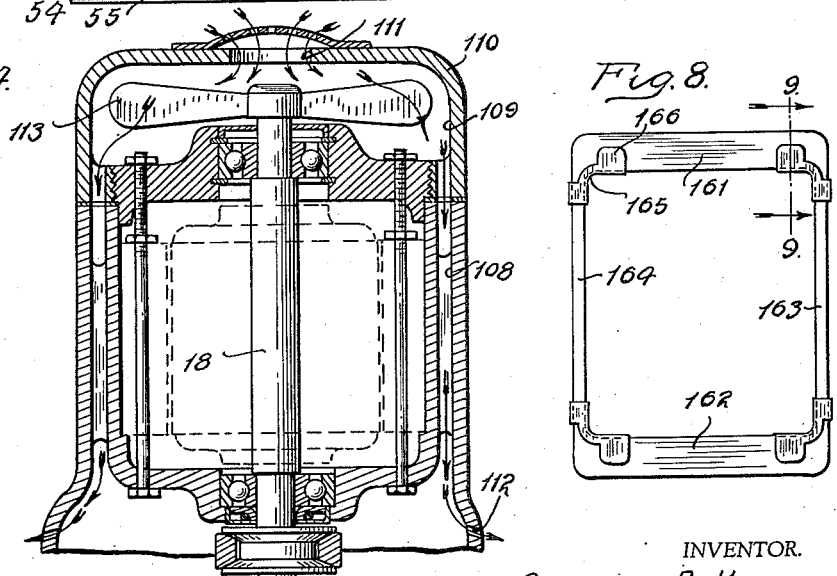
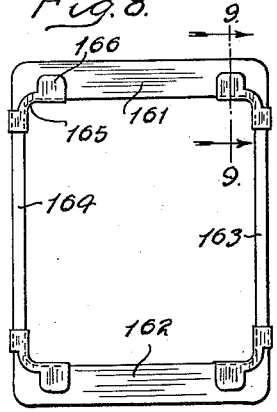
INVENTOR.
OTTMAR A. KEHLE.
BY
ATTORNEY.

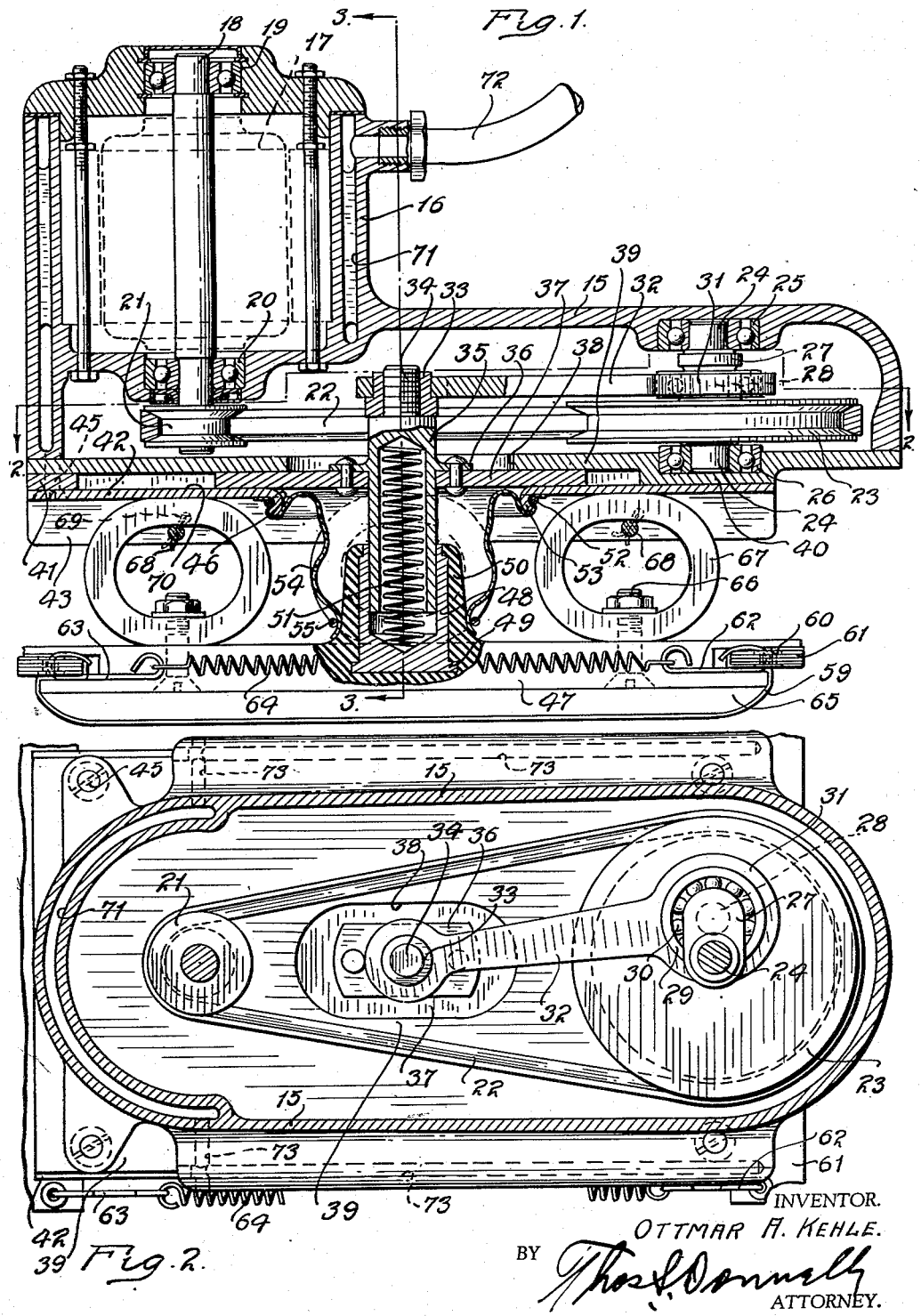

April 12, 1938.                O. A. KEHLE                2,113,694
                              RUBBING MACHINE
                          Filed April 8, 1936            3 Sheets-Sheet 3
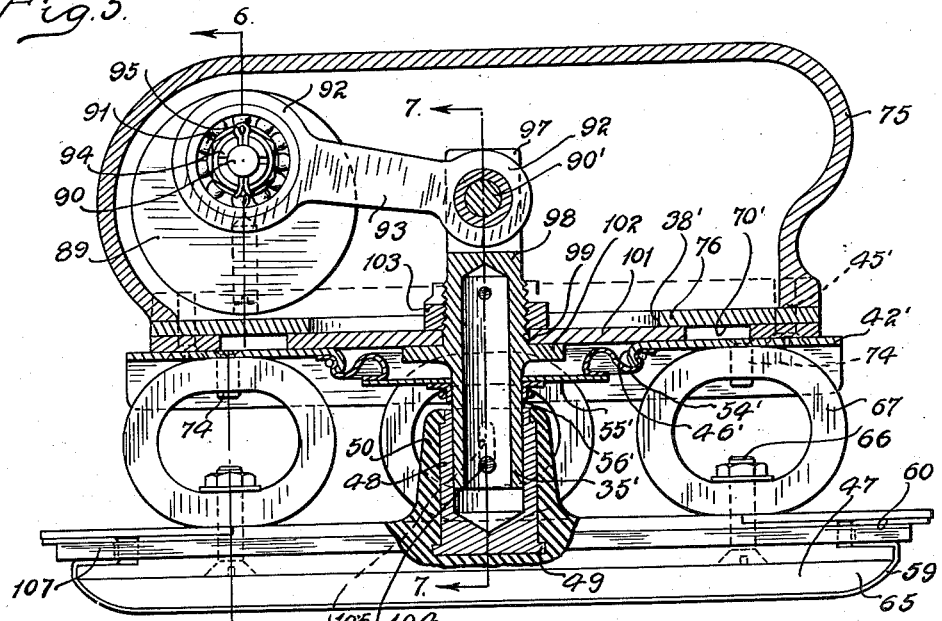
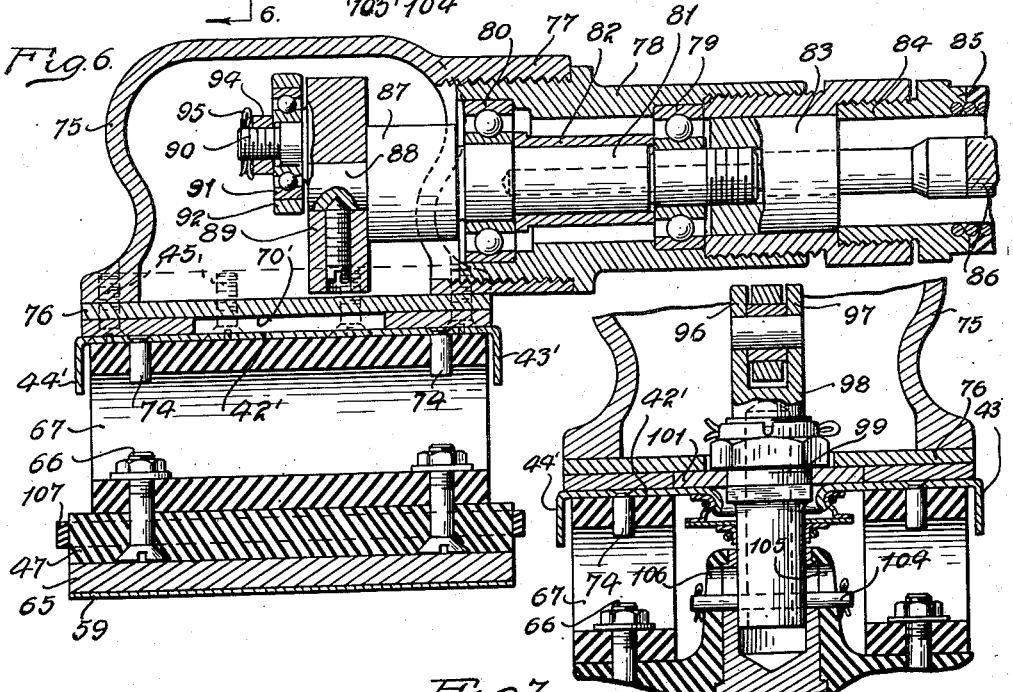
INVENTOR.
OTTMAR A. KEHLE.
BY Thos. L. Donnelly
ATTORNEY.

Patented Apr. 12, 1938

2,113,694

UNITED STATES PATENT OFFICE 2,113,694

RUBBING MACHINE

Ottmar A. Kehle, Detroit, Mich., assignor to Sterling Products Company, Detroit, Mich., a corporation of California Application April 8, 1936, Serial No. 73,284

7 Claims. (Cl. 51—170)

My invention relates to a new and useful improvement in a rubbing machine and has for its object the provision of a machine used for sanding, polishing, burnishing, and such other operations in which a movable contact member is moved over a surface for rubbing purposes either to remove projections and depressions or to produce a smooth surface, produce a finish, or the like.

Another object of the present invention is to provide a device of this class which will be simple in structure, economical of manufacture, durable and highly efficient in use.

Another object of the invention is the provision in a rubbing machine of a contact member associated with a reciprocating mechanism and mounted in floating relation thereto, so as to be unattached relatively to the same.

Another object of the invention is the provision in a rubbing machine of this kind of a contact member which may be reciprocated or moved relatively to the moving mechanism and maintained during its moving operations in a flat condition so that the rubbing or contacting member is not distorted out of its normal plane.

Another object of the invention is the provision in a rubbing machine of this class of a contact member associated with mechanism for reciprocating it and provided with retaining members which may roll during the reciprocation.

Another object of the invention is the provision in a rubbing machine of a contact member having a securing member attached thereto whereby an abrasive sheet or the like may be easily and quickly secured in position.

Another object of the invention is the provision in a machine of this class of a dust shield so constructed and arranged as to effectively shield the various working parts from dust or other foreign material.

Another object of the invention is the provision in a machine of this class of an eccentric arm adapted for effecting reciprocation of the contact member.

Other objects will appear hereinafter.

The invention consists in the combination and arrangement of parts hereinafter described and claimed.

The invention will be best understood by a reference to the accompanying drawings which form a part of this specification, and in which, Fig. 1 is a central, longitudinal, vertical, sectional view of the invention.

Fig. 2 is a sectional view taken on line 2—2 of Fig. 1.

Fig. 3 is a sectional view taken on line 3—3 of Fig. 1.

Fig. 4 is a fragmentary, central, sectional view through the motor housing showing a slightly modified form.

Fig. 5 is a longitudinal, central, vertical, sectional view of a modified form of the invention.

Fig. 6 is a sectional view taken on line 6—6 of Fig. 5.

Fig. 7 is a fragmentary, sectional view taken on line 7—7 of Fig. 6.

Fig. 8 is a plan view of a retainer used in the invention.

Fig. 9 is a sectional view taken on line 9—9 of Fig. 8.

In the form shown in Fig. 1 I have indicated the device used with an elongated housing 15 projecting upwardly from one end of which is a motor housing 16. Mounted in this motor housing is an electric motor 17 having the shaft 18 journalled in the bearings 19 and 20 and provided at one end with the pulley 21 which is fixedly attached thereto and connected by means of the belt 22 to the pulley 23 which is mounted on the shaft 24 journalled in the bearings 25 and 26. Fixedly mounted at one end on the shaft 24 is the eccentric arm 27 projecting outwardly from one face of which is the stud 28 projecting into the bearing comprising the ring 29 and the bearings 30. Embracing this ring 29 is the eccentric band 31 secured to one end of the eccentric arm 32. The opposite end embraces the bushing 33 which is mounted on the threaded stud 34 projecting upwardly from the tubular member 35 provided, intermediate its ends, with the flange 36 by means of which it is secured to the plate 37. This plate 37 is slidably mounted and overlies the opening 38 formed in the bottom 39 of the housing 15. Projecting outwardly from the bottom 39 is a boss 40 of the same thickness as the spacing member 41. Engaging the outer face of the boss 40 and the spacing member 41 is a guide plate 42 provided at opposite sides with the depending flanges 43 and 44. The plate 42 is secured in position by screws 45 and is also provided with a central opening 46 substantially registering with the opening 38.

Used with this mechanism is an operating shoe embodying the plate-like member 47 which is preferably formed from rubber or other similar material and in which is anchored the cup-shaped bushing 48 having at its lower closed end the peripheral flange 49 serving as an anchor.

This member 48 is embraced by a sleeve 50 formed preferably from the same material as the body 47. Snugly engaging in the member 48 is the tubular member 35 and engaging in the tubular member 35 is a spring 51, one end of which engages the closed end of the tubular member 35 and the other end of which engages the closed end of the member 48. Secured by wire 52 around the flange 53 which is pressed downwardly from the guide member 42 around the opening 46 formed therein, is one end of a flexible sleeve or shield 54 and the other end of which is secured in embracing relation by means of the wire 55 on the sleeve 50, so that the entry of dust or foreign material into the tube 35 or the member 48 will be prevented.

A layer 59 of sand paper, emery cloth, or similar abrasive material is used with the device and is folded upwardly so as to overlie the groove 60 formed in the body 47. Engaging in this groove are contact strips 61 of a semi-rigid structure and connected by means of the hooks 62 and 63 and the spring 64. A layer 65 of yieldable material, such as felt or the like, is glued or otherwise supported on the undersurface of the body 47.

Secured by the bolts 66 to the body 47 are the annular hangers 67 which are formed from flexible material, preferably rubber or the like, and which may constitute merely rings or which may be cylindrical tubes. These hangers 67 engage the undersurface of the plate 42 and extended through the flanges 43 and 44 of the plate 42 are rods 68, through the opposite ends of which are projected the cotter pin 69. Thus the shoe is freely mounted on the plate 42 in a free floating condition and the annular members 67, not being fixed at any definite point to the plate 42, are free to rotate on their own axis relatively to the plate 42 and the shoe 47. It is obvious that the shoe embodying the member 47 and the attached parts may move relatively to the plate 42 while remaining in a plane parallel thereto. This is due to the fact that the hangers 67 are easily distorted and compressed into various shapes.

In operation when the motor 17 is running, the pulley 23 will effect through the eccentric action on the eccentric arm 32, a reciprocation of the member 35. This member 35 will, of course, carry with it the slide plate 37 which will slide in the space 70 between the bottom 39 and the plate 42. Through the engagement of the member 35 in the tubular member 48, a reciprocation of the shoe will be effected and the shoe in the reciprocation will not be bent or distorted out of form but will remain in a plane parallel to the plate 42. The pulley 23 will serve as a fly wheel in this operation and a quiet and silently operated machine will thus be provided. Also, on account of the use of the hangers 67, a pressure exerted upon the shoe will be a yielding one and a maximum travel of the shoe may thus be effected while still maintaining it parallel to the plane of the plate 42.

In the housing 16 I have provided a water jacket for cooling of the motor by forming the chamber 71 into which communicates the water delivery pipe 72. The water from the water delivery pipe may pass through the passages 73 and be deposited upon the work piece operated upon so that a wet sanding operation may thus be obtained when desired.

As shown in Fig. 3, studs 74 project downwardly from the plate 42 and extend through the annular hangers 67 so as to prevent longitudinal displacement of the shoe relative to the plate 42, although, if desired, the studs 74 may be dispensed with.

In Fig. 5 and Fig. 6 I have shown a modified form of the construction in which a housing 75 is provided, mounted on a suitable base 76. Projecting laterally from the housing 75 is a threaded neck 77 in which is threaded a bushing 78 carrying the bearings 79 and 80 in which is journalled a shaft 81 on which is mounted the spacing bushing 82. Threaded into the bushing 78 is a fitting 83 threaded into which is a gland 84 attached to a sheathing 85 of a flexible shaft 86. This shaft 86 is projected into the shaft 81 and serves to drive the same. Formed on the shaft 81 is the enlarged portion 87 carrying the reduced portion 88 on which is mounted the eccentric disk 89, projecting outwardly from the face of which is the stud 90 which extends through the bearing 91 which is embraced by the eccentric strap 92 carried by the eccentric arm 93. A nut 94 and a cotter pin 95 serve to secure the bearing in position on the stud 90. The eccentric arm at its opposite end engages between the bifurcations 96 and 97 formed on the upper end of the stud or drive pin 98 which is projected upwardly through the opening 99 formed in a slide plate 101. Engaging the bottom of this slide plate is the flange 102 formed on the drive pin 98 and a nut 103 is threaded on the drive pin to securely clamp the slide plate 101 against the flange 102. This slide plate is positioned in the space 70' which lies between the bottom 76 and the guide plate 42'. This guide plate 42' is provided with the depending flanges 43' and 44'. The plate 42' is secured to the base 76 and the housing 75 by means of the screws 45'. Formed in the plate 42' is an opening 46' substantially registering with the opening 38' formed in the bottom 76. Secured to the flanged portion of the plate 42' is a flexible shield 54' having the body 55' and the neck 56' which embraces the tubular portion 35' of the drive pin. This tubular portion engages in the bushing 48 which is provided with the flange 49 and embedded in the body 47 and encircled by the portion 50. In this form it will be noted that the spring 51 in Fig. 1 is dispensed with and a pin 104 is projected through slots 105 and 106 formed in the members 48 and 50 and through a passage formed in the tubular portion 35'. The hangers 67 are secured by the bolts 66 in the manner described for Fig. 1 but the rods or pins 68 and the cotter pin 69 are eliminated and extending into each of the hangers is a stud 74. These studs 74 prevent lateral movement of the hangers 67 and the use of the studs 74 is optional as the device will function with or without these studs. The body 47 is provided with the groove 60 in which engages a rubber frame 107 to secure the layer 59 in position, this layer engaging the layer of felt 65 which is secured to the bottom of the body 47. The operation is practically as already described. When the shaft 81 is rotated, a reciprocation of the pin 98 will be effected to effect a reciprocation of the shoe. In this form, however, it will be noted that there is no means provided for conducting water to the shoe so that a dry operation would be effected. Aside from this, however, all of the advantages referred to in Fig. 1 may be attained.

In Fig. 4 I have illustrated a slightly modified form of housing 16 which may be used in any device embodying the structure shown in Fig. 1. In the form shown in Fig. 4 the water delivery pipe 72 is dispensed with and the housing 16 is provided with the space 108 opening at the top into the interior 109 of the dome 110 which has an opening 111 formed therein. The space 109 opens through the passages 112 so that air may be discharged downwardly of the operating shoe. Positioned within the chamber 109 of the dome 110 and fixedly mounted upon the shaft 19 of the motor is a fan 113 which will serve to draw the air downwardly and force it to travel in the direction indicated by the arrows in Fig. 4, so as to effect a cooling of the motor.

In Fig. 8 I have indicated a view of a retainer which may be used instead of the contact strip, the hooks 62 and 63 and the spring 64 shown in Fig. 1. This retainer strip is formed in the shape of a closed frame embodying the oppositely disposed end strips 161 and 162 and the side strips 163 and 164. This frame is preferably molded and formed from semi-stiff rubber so that it is flexible, while at the same time the end strips 161 and 162 are rigid in a direction transversely of their width while the same may be flexed in the other direction. This retainer strip is adapted for mounting on the shoe with the end strips 161 and 162 engaging with the grooves 60 to retain the abrasive strip 169 in position. In use, it has been demonstrated that the edge of the abrasive will some times wear or cut through the retaining frame when formed of rubber or a similar material. To avoid this, the corners of the frame are re-enforced by metallic clips 165 having at the opposite ends the spaced lugs 166, the clip itself being formed trough shaped so as to embrace the end and side strips of the frame. This form of retainer reduces the presence of metallic parts over what is shown in the retainer illustrated in Fig. 1 and thus the possibility of scratching or marring a finished surface is reduced to a minimum. The strips 161 and 162, being flexible in one direction and comparatively rigid in the opposite direction, affords a stiff connection and at the same time presents the desired flexibility necessary in a device of this class.

In the retainer shown in Fig. 1 a flexible and yet semi-rigid retaining frame is provided and the use of the hooks 62 and 63 affords the necessary freedom of movement necessitated by the vibration inherent in the device when in operation.

The shoe being formed of a molded material, such as rubber or the like, provides a body which is semi-rigid, that is it is rigid and stiff except when it is subjected to considerable pressure. Under pressure, the shoe will, of course, bend and flex so that when used on surfaces other than plane surfaces, the shoe will follow the various curves and depressions because of its flexibility. At the same time, because of its rigidity and tendency to return to a normal planal state or condition, the shoe is adapted for resisting such pressure as may be transmitted thereto in normal operation. The shoe, therefore, on account of its construction, is of a rigid and yet of a flexible or elastic type. Being molded, it lends itself to the mounting of the members 48 in position without, in any manner, interfering with its characteristics of flexibility and rigidity.

With a rubbing machine constructed as described in the forms illustrated, an economical, durable and highly efficient machine is provided, possessing a minimum amount of vibration and obtaining the objects and advantages enumerated herein.

It will be noted that in both forms the hangers 67 are so arranged that the shoe may move toward and away from the housing which may be termed a supporting body for the actuating or reciprocating mechanism. The shoe will also be capable of movement longitudinally of its length relatively to this supporting body but a lateral tilting of the shoe relatively to the supporting body will be resisted because the annular members are sufficiently wide and substantial to resist such a lateral tilting movement. Consequently, the shoe will, in its movements, be always maintained laterally in alignment with the guide plate beneath which it is mounted or in alignment with the supporting body beneath which it is mounted. The hangers, while flexible, are sufficiently rigid to resist distortion until a certain power of distorting force is reached. These hangers, may, therefore, be said to be flexible and semi-rigid.

While I have illustrated the preferred forms of construction, I do not wish to limit myself other than as such limits are set forth in the claims attached hereto.

Having thus described my invention, what I claim as new and desire to secure by Letters Patent is:

1. A rubbing machine of the class described, comprising: a shoe; mechanism for reciprocating said shoe; a supporting body for said mechanism; a plurality of annular flexible members positioned between said shoe and said supporting body for spacing said shoe therefrom and connecting said shoe loosely thereto, the periphery of said annular members engaging, at diametrically opposite points, said supporting body and said shoe.

2. A rubbing machine of the class described, comprising: a shoe; a mechanism for reciprocating said shoe; a supporting body for said mechanism; a plurality of annular flexible members positioned between said body and said shoe and engaging said body and said shoe and spacing the same apart; means for securely connecting said annular members to said shoe; and means for loosely connecting said annular members to said body for free movement relatively thereto excepting laterally.

3. A rubbing machine of the class described, comprising: a shoe; a mechanism for reciprocating said shoe; a supporting body for said mechanism; a plurality of annular flexible members positioned between said body and said shoe and engaging, at diametrically opposite points on their peripheries, said body and said shoe and spacing the same apart; and means for securely connecting said annular members to said shoe.

4. A rubbing machine of the class described, comprising: a shoe; means for reciprocating said shoe; a supporting body for said reciprocating means; flexible annular members positioned between said shoe and said supporting body for engaging said shoe and said supporting body; means for connecting said annular members to said shoe; and a rod carried by said supporting body and projected through said annular members for effecting a loose connection of said annular members to said supporting body.

5. A rubbing machine of the class described, comprising: a rubbing shoe; a mechanism for reciprocating said shoe; a supporting body for said mechanism; a plurality of annular flexible members positioned between said body and said shoe, and engaging said body and said shoe and spacing the same apart, the axes of said annular members extending in a plane lying between and parallel to the planes of said body and said shoe;

and means for floatingly connecting said shoe to said supporting body.

6. A rubbing machine of the class described, comprising a shoe; a mechanism for reciprocating said shoe; a supporting body for said mechanism; a plurality of annular flexible members positioned between said body and said shoe and engageable with said body and said shoe and spacing the same apart; means for connecting said annular members to said shoe; and means for loosely connecting said annular members to said body for free movement relatively thereto except laterally.

7. A rubbing machine of the class described, comprising a shoe; a mechanism for reciprocating said shoe; a supporting body for said mechanism; a plurality of annular flexible members positioned between said body and said shoe and engageable with said body and said shoe and spacing the same apart, the axes of said annular members extending transversely of and between the planes of said supporting body and said shoe; means for connecting said annular members to said shoe; and means for connecting said annular members to said body, said annular members being rockable longitudinally of said body on said last-named connecting means as an axis, said connecting means preventing lateral movement of said annular members relatively to said body.

OTTMAR A. KEHLE.